US 8,458,664 B2

(12) United States Patent
Macedo

(10) Patent No.: US 8,458,664 B2
(45) Date of Patent: Jun. 4, 2013

(54) COMMAND LINE INTERFACE PERMUTATION EXECUTOR

(75) Inventor: Mario Gonzalez Macedo, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1136 days.

(21) Appl. No.: 12/391,087

(22) Filed: Feb. 23, 2009

(65) Prior Publication Data

US 2010/0228789 A1  Sep. 9, 2010

(51) Int. Cl.
*G06F 9/44* (2006.01)
(52) U.S. Cl.
USPC .................. 717/124; 717/127; 717/131
(58) Field of Classification Search
None
See application file for complete search history.

(56) References Cited

U.S. PATENT DOCUMENTS

| | | | | |
|---|---|---|---|---|
| 5,159,600 A * | 10/1992 | Chintapalli et al. | ......... | 714/738 |
| 5,542,043 A * | 7/1996 | Cohen et al. | ...................... | 714/32 |
| 5,831,995 A * | 11/1998 | Brown et al. | .................. | 714/738 |
| 5,850,511 A * | 12/1998 | Stoecker et al. | ............. | 714/38.1 |
| 6,625,590 B1 | 9/2003 | Chen et al. | ....................... | 707/1 |
| 6,961,873 B2 * | 11/2005 | Dubovsky | ................... | 714/38.13 |
| 6,966,052 B1 * | 11/2005 | Grindeland et al. | .......... | 717/131 |
| 6,988,139 B1 * | 1/2006 | Jervis et al. | ..................... | 709/226 |
| 7,010,782 B2 * | 3/2006 | Narayan et al. | ............... | 717/124 |
| 7,126,717 B2 * | 10/2006 | Jeyachandran et al. | ........ | 358/1.9 |
| 7,254,524 B1 | 8/2007 | Richey et al. | ................... | 703/22 |
| 7,272,822 B1 * | 9/2007 | Riggins et al. | ................ | 717/124 |
| 7,610,578 B1 * | 10/2009 | Taillefer et al. | ............... | 717/124 |
| 7,707,555 B2 * | 4/2010 | Spertus et al. | ................ | 717/127 |
| 2003/0069956 A1 * | 4/2003 | Gieseke et al. | ............... | 709/223 |
| 2005/0144530 A1 * | 6/2005 | Louden et al. | .................. | 714/38 |
| 2006/0156269 A1 * | 7/2006 | Hoffman, Jr. | .................. | 716/19 |
| 2006/0235968 A1 | 10/2006 | Murray et al. | ................ | 709/224 |
| 2006/0271347 A1 | 11/2006 | Hoffman, Jr. | .................. | 703/22 |
| 2007/0006153 A1 * | 1/2007 | Sultan | ......................... | 717/124 |
| 2007/0011660 A1 * | 1/2007 | Garyali et al. | ................ | 717/127 |
| 2007/0028217 A1 * | 2/2007 | Mishra et al. | ................. | 717/124 |
| 2007/0061784 A1 * | 3/2007 | Prakash et al. | ................ | 717/127 |
| 2007/0174713 A1 | 7/2007 | Rossi et al. | ...................... | 714/38 |
| 2007/0250799 A1 * | 10/2007 | Bunin et al. | ..................... | 716/5 |
| 2007/0266137 A1 | 11/2007 | Malik | .......................... | 709/223 |
| 2008/0195982 A1 | 8/2008 | Nahir et al. | ...................... | 716/2 |
| 2009/0199160 A1 * | 8/2009 | Vaitheeswaran et al. | ...... | 717/124 |
| 2009/0288072 A1 * | 11/2009 | Kania | .......................... | 717/131 |
| 2009/0307763 A1 * | 12/2009 | Rawlins et al. | ................... | 726/5 |
| 2009/0320002 A1 * | 12/2009 | Peri-Glass et al. | ............ | 717/131 |

OTHER PUBLICATIONS

Daniel Rohde, Implementation of a Command-Line Interface for the VizzAnalyzer, Vaxjo University, 2008, pp. 3-26.*
Cristian Cadar, KEE: Unassisted and Automatic Generation of High-Coverage Tests for Complex Systems Programs, Stanford University, 2008, pp. 2-12.*

(Continued)

*Primary Examiner* — Thuy Dao
*Assistant Examiner* — Mongbao Nguyen
(74) *Attorney, Agent, or Firm* — Zilka-Kotab, PC

(57) ABSTRACT

A method according to one embodiment includes receiving a command dataset of command data; generating command permutations using the command data; sequentially inputting the command permutations to a command line interface of an application; receiving results of execution of the command permutations; generating a log of at least one of the results and a derivative thereof; and storing the log on a data storage device or medium.

18 Claims, 5 Drawing Sheets

OTHER PUBLICATIONS

Aynur Abdurazik, Generating Test Cases from UML Specification, George Mason University, 1999, pp. 16-19.*
"Symbian Developer Library: TestDriver Guide" http://www.symbian.com/developer/techlib/v9.1docs/doc_source/n10356/TestTools/TestDriver/index.html; Feb. 23, 2009.
"Symbian Developer Library: Defining Command Line Tests" http://www.symbian.com/developer/techlib/v9.1docs/doc_source/n10356/TestTools/TestDriver/XMLDefinitions/DefineCommandLineTests.guide.html#CommandLineTest%2eguide; Feb. 23, 2009.
Disclosed Anonymously, "Command Line Interface for HTML & XML Web Applications" ip.com Prior Art Database; IPCOM000018829D; Aug. 15, 2003.
Disclosed Anonymously, "A Framework for Facilitating Rapid Command Line Interface Development" ip.com Prior Art Database; IPCOM000146819D; Feb. 23, 2007.

* cited by examiner

COMMAND LINE INTERFACE PERMUTATION EXECUTOR

BACKGROUND

The present invention relates to computer system testing, and more particularly, this invention relates to command line interface permutations.

Command line interfaces (CLIs) typically have many parameters per command to choose from, with each of those parameters having many values that the parameter can accept and possibly an infinite number of invalid values. Moreover, CLIs usually have a big command set, with one command for each important function the CLI can perform. Providing manual input for all the commands, parameters for each command, and values for each parameter to drive testing of the CLI under test conditions can be a daunting, if not improbable task. Typically, there are five reasons why the task is so difficult:

1) Manually typing the commands opens up the possibility for the tester to mistype any part of the command string, such as the command itself, parameters, values, etc., and this can result in a needless expenditure of valuable time, as the command will not run properly and/or as anticipated.
2) If the commands are entered manually, then all the time that is used to enter the command strings is generally excessive and wasted, since a human is slower (by several orders of magnitude) than a modern processor that can input the commands in place of a human tester.
3) Unless an extremely effective and reliable process is used to track and organize which commands have been run, generally a subset of the commands will have to be rerun, wasting additional time. This is because it is very difficult for a human to keep track of which commands have been run, even with the aid of tools like spreadsheets, since by the very nature of the problem, the quantity of commands grows exponentially with the number of values per parameter, parameter per command, and commands that the CLI supports.
4) Manually analyzing the result of the command entered and verifying whether it succeeded or failed is almost always repetitive and can be better handled by automation inline with the command's execution.
5) During development of the CLI and other components of the system that the CLI interacts with, executing some commands may make the CLI hang (stop functioning properly) and the test must be re-started from the beginning, losing all work completed up to that point. Automating this "cleanup-and-install" task in addition to logging the failed execution and skipping to the next execution is a repetitive task that can take additional time to do.

Therefore, a solution that can address the shortcomings of current methodologies and systems to test commands would save enormous amounts of time and energy on the part of human testers.

SUMMARY

A method according to one embodiment includes receiving a command dataset of command data; generating command permutations using the command data; sequentially inputting the command permutations to a command line interface of an application; receiving results of execution of the command permutations; generating a log of at least one of the results and a derivative thereof; and storing the log on a data storage device or medium.

A computer program product according to one embodiment includes a computer usable medium having computer usable program code stored therewith. The computer usable program code includes computer usable program code configured to receive a command dataset of command data; computer usable program code configured to generate command permutations using the command data; computer usable program code configured to sequentially input the command permutations to a command line interface; computer usable program code configured to receive results of execution of the command permutations; and computer usable program code configured to generate a log of at least one of the results and a derivative thereof.

A method according to another embodiment includes receiving a command dataset of command data of valid data that is expected to not cause an execution error and invalid data that is expected to cause an execution error; generating command permutations using the command data; sequentially inputting the command permutations to a command line interface; determining whether to skip an execution based on an elapsed time of the execution; receiving results of execution of the command permutations; generating a log of at least one of the results and a derivative thereof; and storing the log on a data storage device or medium.

A computer program product according to yet another embodiment includes a computer usable medium having computer usable program code stored therewith. The computer usable program code includes computer usable program code configured to receive a command dataset of command data of valid data that is expected to not cause an execution error, and invalid command data that is expected to cause an execution error; computer usable program code configured to generate command permutations using the command data; computer usable program code configured to sequentially input the command permutations to a command line interface; computer usable program code configured to determine whether to skip an execution based on an elapsed time of the execution; computer usable program code configured to receive results of execution of the command permutations; computer usable program code configured to generate a log of at least one of the results and a derivative thereof; and computer usable program code configured to store the log on a data storage device or medium.

Other aspects and embodiments of the present invention will become apparent from the following detailed description, which, when taken in conjunction with the drawings, illustrate by way of example the principles of the invention.

DETAILED DESCRIPTION

Figure 1:
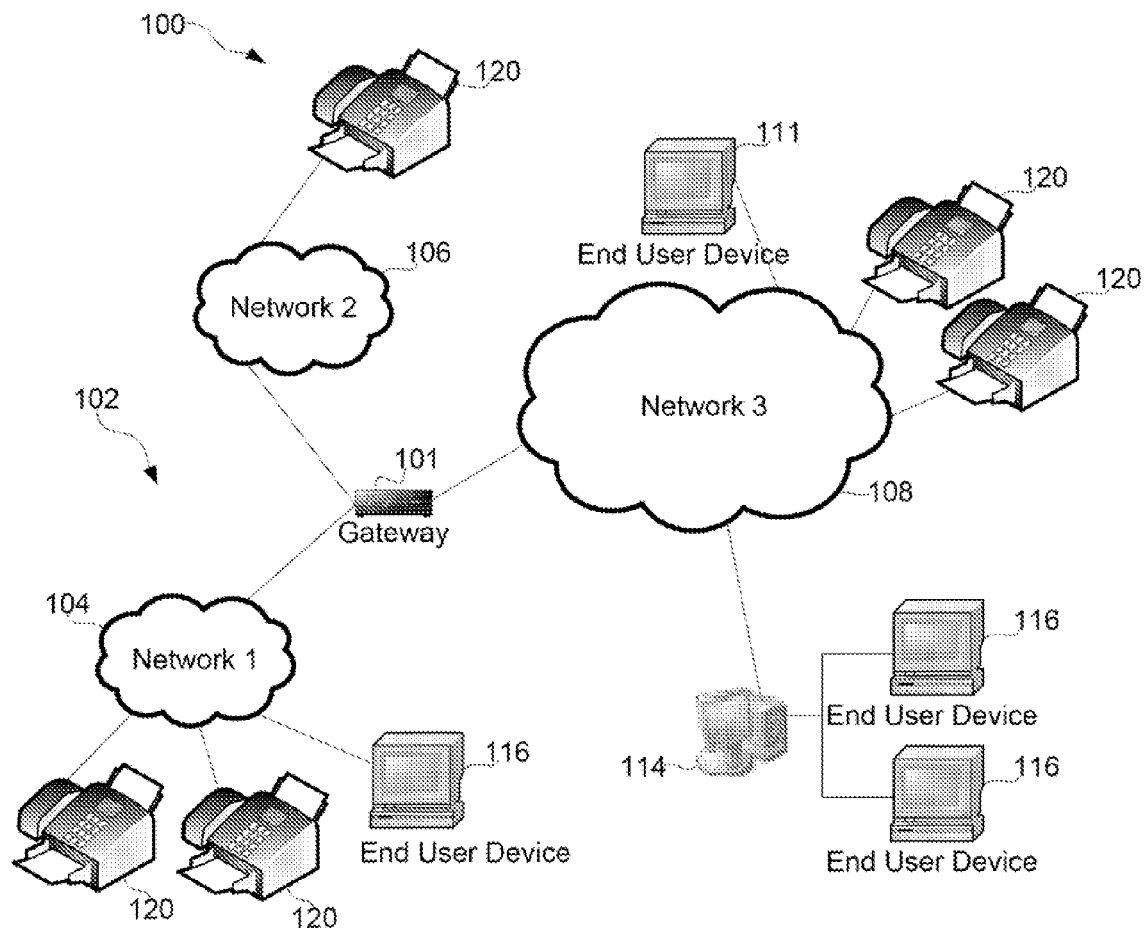
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems, methods and computer program products for automated execution of command line permutations, which may be applied during testing of a operation of a system or application program. Particularly, any number of command permutations may be automatically generated and input into a command line interface to allow assessment of how the system or application program responds to each command permutation.

Accordingly, various aspects of the methodology disclosed herein may solve the issues associated with manual entry of command line interfaces by automating the execution of the permutations of its commands, timing those executions so that hung commands can be skipped, analyzing the results of executions to see if it passed or failed, logging those results for later use, and/or allowing the tester to specify custom "cleanup-and-install" routines that the computer program product may execute when necessary. Since automation is effectively faster than manual typing, this approach can dramatically decrease the time spent on such tests and, thus, enable the tester to spend time in other crucial areas.

In one general embodiment, a method comprises: receiving a command dataset of command data; generating command permutations using the command data; sequentially inputting the command permutations to a command line interface of an application; receiving results of execution of the command permutations; optionally, determining whether the command permutation passed or failed based on criteria specified by the user and applied to the results of execution of the command permutations; generating a log of at least one of the results and a derivative thereof; and storing the log on a data storage device or medium.

In another general embodiment, a computer program product includes computer usable medium having computer usable program code stored therewith, the computer usable program code comprising: computer usable program code configured to receive a command dataset of command data; computer usable program code configured to generate command permutations using the command data; computer usable program code configured to sequentially input the command permutations to a command line interface; computer usable program code configured to receive results of execution of the command permutations; optionally, computer usable program code configured to determine whether the command permutation passed or failed based on criteria specified by the user and applied to the results of execution of the command permutations; and computer usable program code configured to generate a log of at least one of the results and a derivative thereof.

In another general embodiment, a method comprises: receiving a command dataset of command data of valid data that is expected to not cause an execution error and invalid data that is expected to cause an execution error; generating command permutations using the command data; sequentially inputting the command permutations to a command line interface; determining whether to skip an execution based on an elapsed time of the execution; receiving results of execution of the command permutations; optionally, determining whether the command permutation passed or failed based on criteria specified by the user and applied to the results of execution of the command permutations; generating a log of at least one of the results and a derivative thereof; and storing the log on a data storage device or medium.

In another general embodiment, a computer program product includes a computer usable medium having computer usable program code stored therewith, the computer usable program code comprising: computer usable program code configured to receive a command dataset of command data of valid data that is expected to not cause an execution error, and invalid command data that is expected to cause an execution error; computer usable program code configured to generate command permutations using the command data; computer usable program code configured to sequentially input the command permutations to a command line interface; computer usable program code configured to determine whether to skip an execution based on an elapsed time of the execution; computer usable program code configured to receive results of execution of the command permutations; optionally, computer usable program code configured to determine whether the command permutation passed or failed based on criteria specified by the user and applied to the results of execution of the command permutations; computer usable program code configured to generate a log of at least one of the results and a derivative thereof; and computer usable program code configured to store the log on a data storage device or medium.

As will be appreciated by one skilled in the art, the present invention may be embodied as a system, method or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A facsimile machine 120 or series of facsimile machines 120 may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
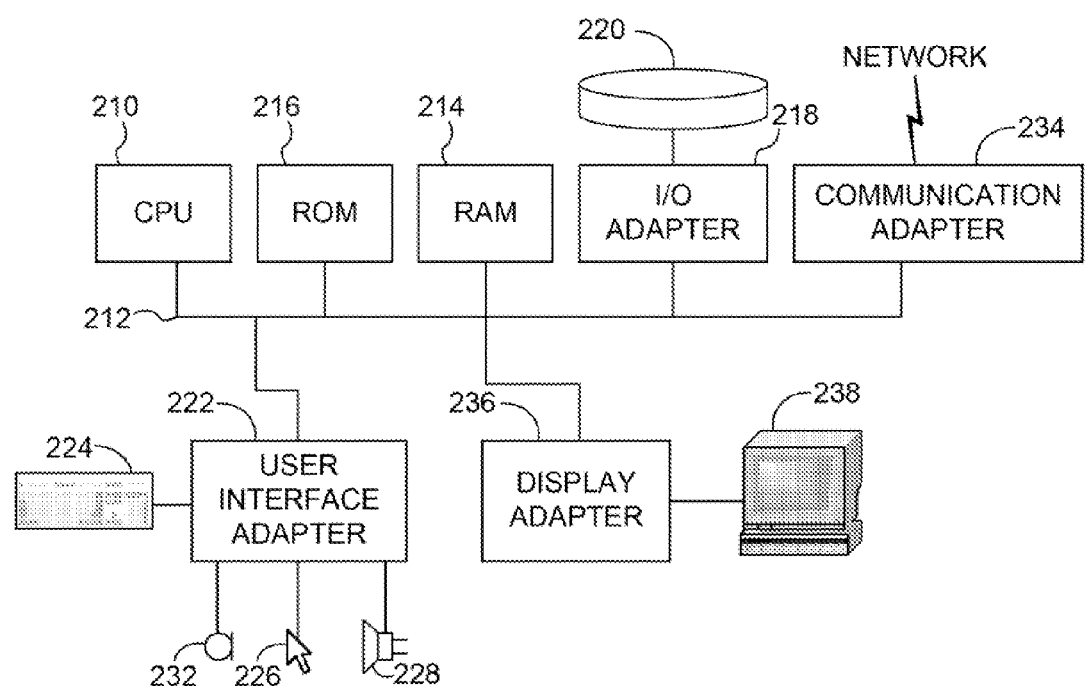
FIG. 2 shows a representative hardware environment that may be associated with the servers and/or clients of FIG. 1, in accordance with one embodiment.

FIG. 2 shows a representative hardware environment associated with a user device 116 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
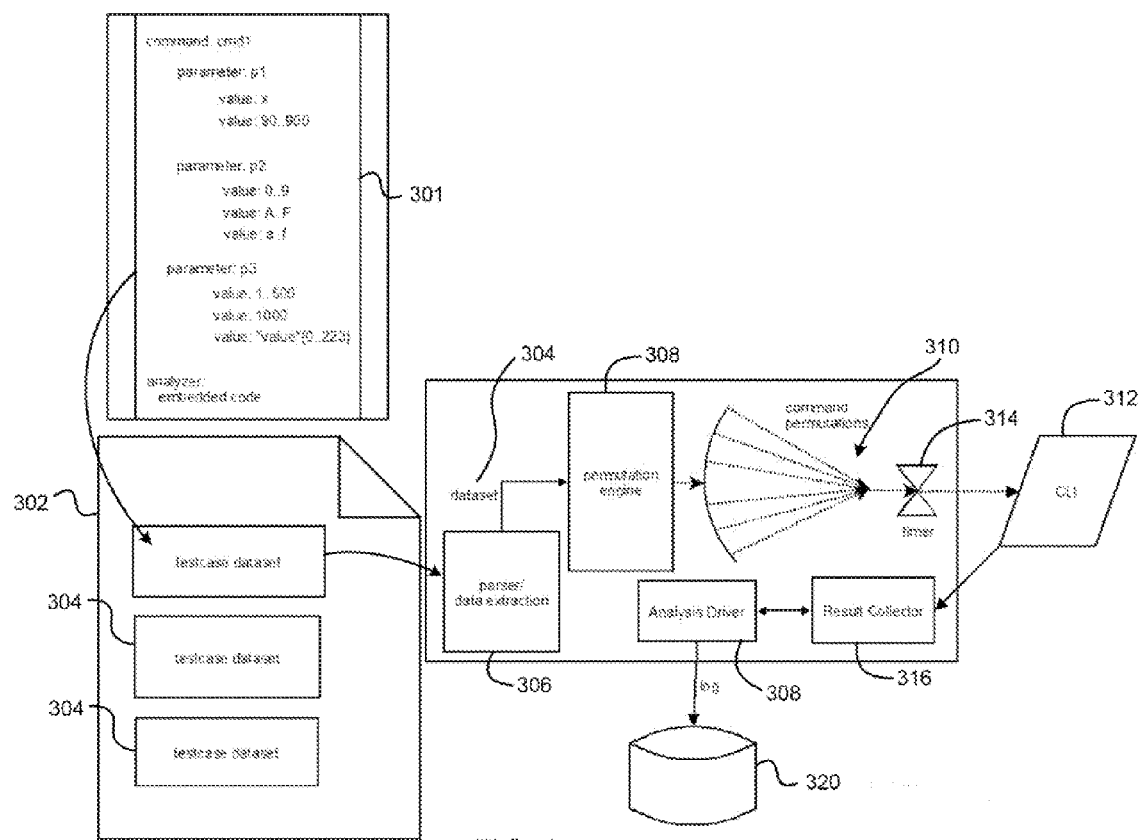
FIG. 3 depicts one embodiment of a method for testing a program, application, and/or system.

FIG. 3 depicts one embodiment of a method having modules that may parse an XML file 302 with command datasets 304. Each command dataset 304 may contain a command to exercise, the parameters 301 to exercise for that command, and/or the values that those parameters will take, as well as additional information described in more detail below. A command dataset 304 may potentially represent many command permutations that can be executed (permutations that are to be tested in order to achieve reliable test coverage but which time may not allow if tests are performed manually). A data extraction and parsing module 306 of an executor may parse this information and then pass it to a permutation engine 308 which may generate the actual command permutations 310 and pass them to a command line interface (CLI) 312 of a target system. In general, the data extraction and parsing module 306 extracts the commands, parameters, and values of the parameters from the command dataset, and passes the information to the permutation engine 308. The permutation engine 308 converts the data to the command permutations 310. In one approach, the permutation engine 308 steps through all parameter value combinations associated with a particular command, thereby generating all possible combinations of parameters in the command data for generating the command permutations. To illustrate operation of the permutation engine, consider the parameters 301 shown in FIG. 3. The permutation engine 308 may step through each combination of parameters p1, p2 and p3 for command cmd1 sequentially until all possible combinations of the parameters have been made. An example of what the permutation engine 308 may generate based on the parameters 301 is set forth immediately below. As shown, the first permutation includes cmd1, the first value for p1, the first value for p2 and the first value for p3. The second permutation includes cmd1, the first value for p1, the first value for p2 and the first value for p3. Once all of the values for p3 have been exhausted, a value of parameter p1 or p2 may be incremented to the next value, and all of the values for p3 are again applied. The process continues until all possible value combinations have been applied. As shown in the example below, the final command permutation includes cmd1, the last value for p1, the last value for p2 and the last value for p3.

cmd1 p1×p2 0 p3 1 cmd1 p1×p2 0 p3 2

. . .

cmd1 p1 900 p2 f p3 value222 cmd1 p1 900 p2 f p3 value223

In some embodiments, the executor may skip some executions if a timer 314 expires (denoting that the command has not executed properly, possibly indicating the target machine whose CLI is being tested has hung. However, it may also be the case that only the target CLI is unresponsive, and not the entire machine hosting that CLI). A results collector module 316 may work in conjunction with an analysis driver 318 to analyze the results, and mark each result as pass/fail (such as by a bit, 0 or 1), and log such executions in a database 320 for later use.

In some more embodiments, the method may contain the ability for each command dataset to specify the allowed time the executor can wait until it determines that an execution has "hung," so that the execution can be stopped and skipped. In addition, the method may also offer the ability for any routine to be run after skipping hung executions to be specified in the input file. In this way, a routine, such as a custom routine designed specifically to deal with hung executions, can be run after a hung execution is detected so that further data logging and analysis can be performed to further define what caused the hang. Also, each dataset may contain the name of the test that the dataset represents, the date of the test, the tester's name, the system name, etc., so that the logger can associate the pass/failed/skipped execution with a test case, with the expected result also being specified in each dataset.

Figure 4:
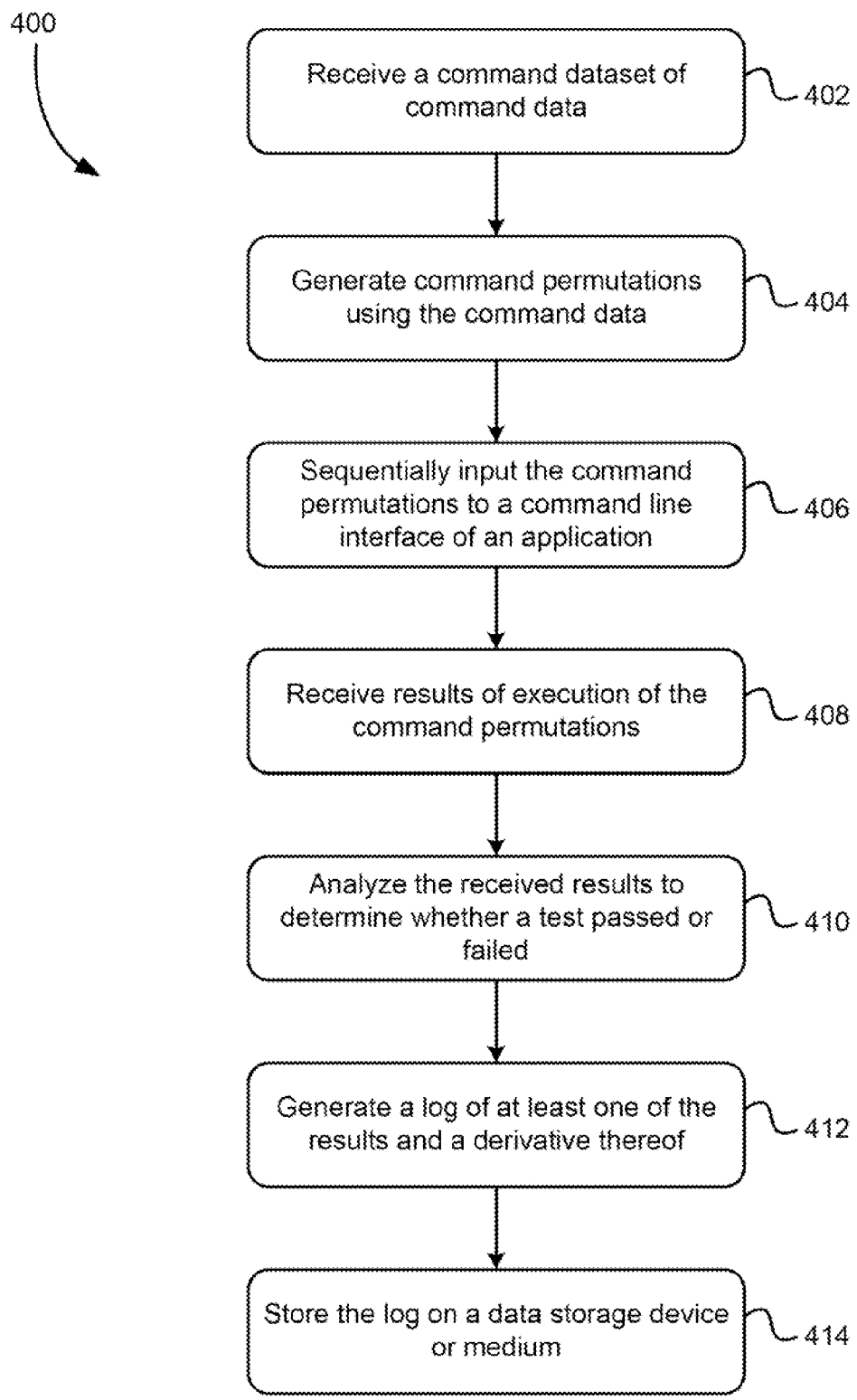
FIG. 4 is a flowchart showing a method according to one embodiment.

Now with reference to FIG. 4, a method 400 is shown in accordance with one embodiment. The method 400 may be performed in any desired environment, including those described in FIGS. 1-3, and may be performed in any desired order or sequence. Further, the method 400 may be repeated as many times as desired to achieve a more thorough analysis of the program, application, and/or system being tested.

In operation 402, a command dataset is received of command data which may include specific values and/or ranges. The configuration and content of the command dataset may vary depending on the type of program, application, and/or system being tested, the desired effect of the testing, the aspect being tested, etc. In addition, the breadth of specific values and/or ranges may vary depending on the results of any previous testing that may have been performed (e.g., as more testing is performed, more defined ranges and limits, along with identified trouble spots for increased scrutiny, may be included in the command dataset), the type of program, application, and/or system being tested, the target of the testing, etc.

In some embodiments, the command dataset may include multiple testcases, wherein each of the testcases may comprise a unique set of command data. In this way, the testing may be segmented into testcases designed to more effectively and accurately probe certain aspects of the program, application, and/or system being tested. The number of testcases is limited only by the time allotted to testing and the creativity of the tester, and each testcase may be run separately, in a series, randomly, etc.

In some more embodiments, the command data may include invalid command data that is expected to cause an execution error. In this way, not only valid value testing may be performed, but negative testing may be performed as well. Generally, all valid tests will be performed on any given program, application, and/or system during the testing phase; however, since there are an infinite number of negative tests available to be run, an adequate sampling size of invalid commands, as would be known to one of skill in the relevant art, may be included in the command data. However, more or less invalid command data may be included as desired by the tester. Also, if an execution gets hung, then more invalid command data may be included to probe what caused this unexpected execution hang.

Also, method 400 may further comprise parsing the command dataset into the command data, according to some embodiments.

In operation 404, command permutations may be generated using the command data. The command permutations may include any amount of command data, and may repeat some commands. Also, each command permutation may include one, some, or all of the commands from the command data, in any order. In addition, the command permutations will be determined as best suited to test the individual program, application, and/or system under evaluation as one of ordinary skill in the relevant art would know.

In operation 406, the command permutations may be sequentially input to a command line interface of an application. The command permutations may be input sequentially all at once, some may be input sequentially all at once, or they may be input sequentially after the previously entered command permutation has completed.

In operation 408, results of execution may be received of the command permutations. The results may be received by a system running the command permutations, or by another system monitoring the process. Results may include pass/fail/skipped information, date, time, system configuration, previous command, subsequent command, or any other information that may be helpful to one of ordinary skill in the relevant art for testing a program, application, and/or system.

In some embodiments, the method 400 may further comprise determining whether to skip an execution based on an elapsed time of the execution. For example, if an execution has not completed after a predetermined amount of time, for instance 0.5 second, 1 second, 2 seconds, 10 seconds, etc., the method 400 may determine that the execution has hung and may skip the execution so as to complete the command permutation. In some further embodiments, a prespecified routine may be executed after and/or before skipping an execution. For example, this may enable a tracking function to keep track of which commands failed, why they failed, what other parameters were when it failed, etc. Also, one embodiment allows prespecified routines to execute before and after every successful permutation execution (e.g., such as setup and cleanup routines), before and after every testcase (e.g., which may include one or more permutations) executes, and before and after every testsuite (e.g., arbitrary set of testcases) executes.

In optional operation 410, the received results may be analyzed to determine whether a test (e.g., a command permutation) passed or failed using, e.g., embedded code located in the same file where the command dataset is located. The passed/failed results may be saved in persistent storage, e.g., logged.

In operation 412, a log of at least one of the results and a derivative thereof may be generated which may include a summary thereof, a pass/fail/skipped indication, information derived from an analysis of the results, etc.

In operation 414, the log may be stored on a data storage device or medium, such as a magnetic tape, disk drive, memory module, RAM, ROM, flash memory, etc. In some additional embodiments, the log may be transmitted to another device before being stored, such as through a USB connection, Internet, network, wireless network, etc.

In some embodiments, expected results of the execution may be added to the log. This may be useful for a troubleshooter to review the results and expected results, thereby gaining some notion of what might have caused the error, then producing additional command line permutations to test the conceived error.

Figure 5:
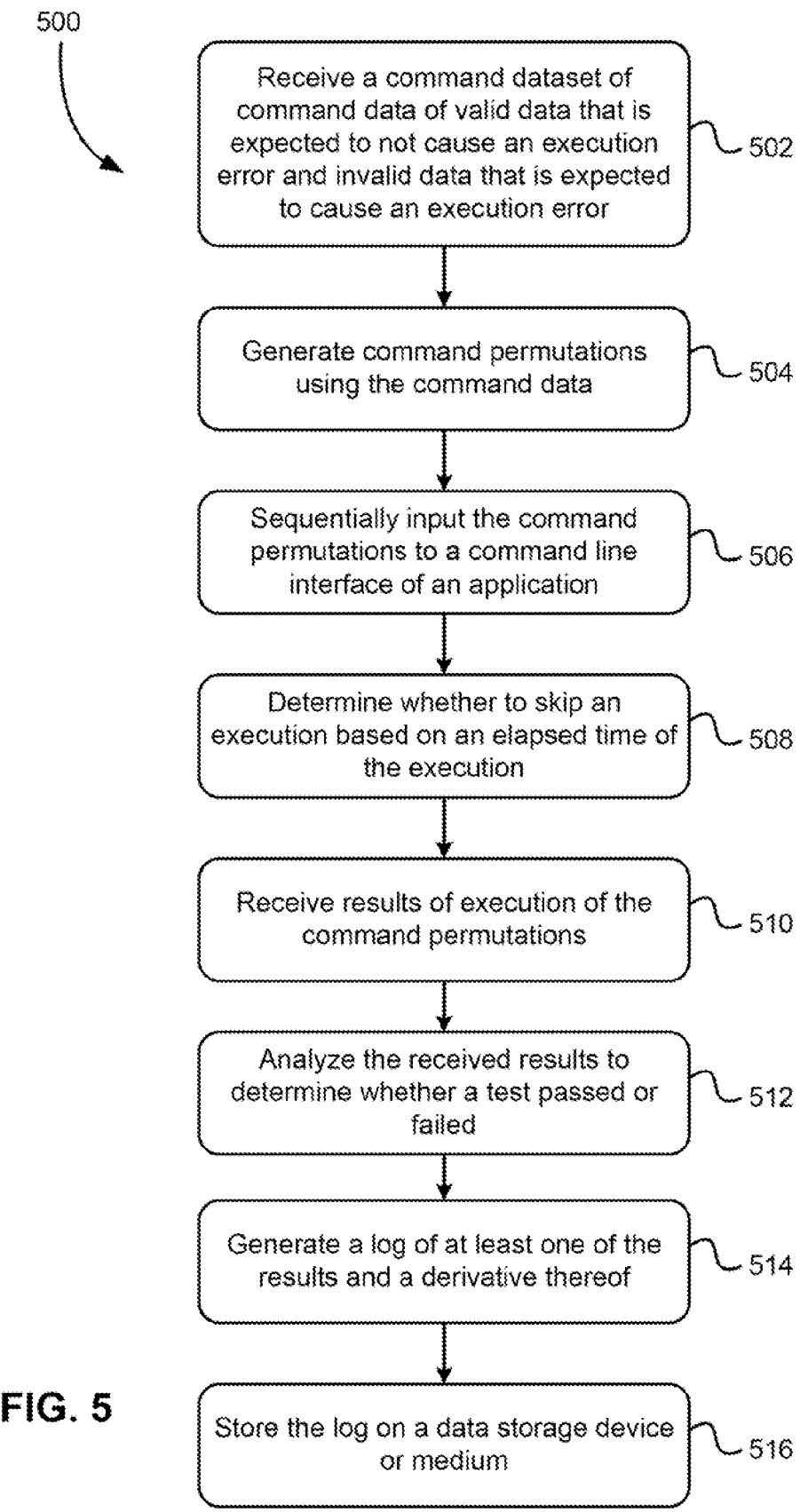
FIG. 5 is a flowchart showing a method according to one embodiment.

With reference to FIG. 5, a method 500 is shown in accordance with one embodiment. The method 500 may be performed in any desired environment, including those described in FIGS. 1-3, and may be performed in any desired order or sequence. Further, the method 500 may be repeated as many times as desired to achieve a more thorough analysis of the program, application, and/or system being tested.

In operation 502, a command dataset is received of command data of valid data that is expected to not cause an execution error and invalid data that is expected to cause an execution error. Both types of command data may be useful to the testing of a program, application, and/or system since valid data may test whether the programming is properly entered, and invalid data may test whether the programming performs unexpectedly when presented with a until-now-unthought-of variation.

In some embodiments, the command dataset may include multiple testcases, wherein each of the testcases may comprise a unique set of command data. In this way, the testing may be segmented into testcases designed to more effectively and accurately probe certain aspects of the program, application, and/or system being tested. The number of testcases is limited only by the time allotted to testing and the creativity of the tester, and each testcase may be run separately, in a series, randomly, etc.

In operation 504, command permutations are generated using the command data. The command permutations may include any amount of command data, and may repeat some commands. Also, each command permutation may include one, some, or all of the commands from the command data, in any order. In addition, the command permutations will be determined as best suited to test the individual program, application, and/or system under evaluation as one of ordinary skill in the relevant art would know.

In operation 506, the command permutations are sequentially input to a command line interface. The command permutations may be input sequentially all at once, some may be input sequentially all at once, or they may be input sequentially after the previously entered command permutation has completed.

In operation 508, it is determined whether to skip an execution based on an elapsed time of the execution. For example, if an execution has not completed after a predetermined amount of time, for instance 0.5 second, 1 second, 2 seconds, 10 seconds, etc., the method 500 may determine that the execution has hung and may skip the execution so as to complete the command permutation. In some further embodiments, a prespecified routine may be executed after and/or before skipping an execution. For example, this may enable a tracking function to keep track of which commands failed, why they failed, what other parameters were when it failed, etc. Also, one embodiment allows prespecified routines to execute before and after every successful permutation execution (e.g., such as setup and cleanup routines), before and after every testcase (e.g., which may include one or more permutations) executes, and before and after every testsuite (e.g:, arbitrary set of testcases) executes.

In operation 510, results of execution of the command permutations are received. The results may be received by a system running the command permutations, or by another system monitoring the process. Results may include pass/fail/skipped information, date, time, system configuration, previous command, subsequent command, or any other information that may be helpful to one of ordinary skill in the relevant art for testing a program/system.

In optional operation 512, the received results may be analyzed to determine whether a test (e.g., a command permutation) passed or failed using embedded code located in the same file where the command dataset is located. The passed/failed results may be saved in persistent storage, e.g., logged.

In operation 514, a log is generated of at least one of the results and a derivative thereof. According to some embodiments, expected results of the execution may be added to the log.

In operation 516, the log is stored on a data storage device or medium, such as a magnetic tape, disk drive, memory module, RAM, ROM, flash memory, etc. In some additional embodiments, the log may be transmitted to another device before being stored, such as through a USB connection, Internet, network, wireless network, etc.

In some embodiments, the method 500 may further include parsing the command dataset into the command data.

In addition to being executed independently, either method 500 and/or method 400 may be comprised in a computer program product.

In one embodiment, a computer program product comprises a computer usable medium having computer usable program code stored therewith. The computer usable program code may include code configured to receive a command dataset of command data which may include specific values and/or ranges. Also, the computer usable program code may include code configured to generate command permutations using the command data and to sequentially input the command permutations to a command line interface. In addition, the computer usable program code may include code configured to receive results of execution of the command permutations and to generate a log of at least one of the results and a derivative thereof which may include a summary thereof, a pass/fail/skipped indication, information derived from an analysis of the results, etc. Of course, the program code may be configured to provide more functionality and input/output capability.

In some embodiments, the command dataset may include multiple testcases, wherein each of the testcases may comprise a unique set of command data.

In more embodiments, the command data may include invalid command data that is expected to cause an execution error.

In even more embodiments, the computer program product may also comprise computer usable program code configured to parse the command dataset into the command data.

Also, according to some embodiments, the computer program product may also comprise computer usable program code configured to determine whether to skip an execution based on an elapsed time of the execution. Further, the computer usable program code may be configured to execute a prespecified routine after skipping an execution. Moreover, the computer usable program code that allows prespecified routines to execute before and after every successful permutation execution (e.g., such as setup and cleanup routines), before and after every testcase (e.g., which may include one or more permutations) executes, and before and after every testsuite (e.g., arbitrary set of testcases) executes.

According to more embodiments, the computer usable program code may be configured to add expected results of the execution to the log.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a command dataset of command data;
generating command permutations using the command data;
sequentially inputting the command permutations to a command line interface of an application;
executing each of the command permutations;
determining whether to skip an execution of one of the command permutations based on an elapsed time of the execution;
receiving results of execution of each of the command permutations;
generating a log of at least one of the results and a derivative thereof;
storing the log on a data storage device or medium; and
executing a prespecified routine before and/or after skipping an execution of a command permutation for tracking at least which commands fail and parameter values during execution of the command permutation,
wherein the command line interface is on a target system, and
wherein the command data includes invalid command data that is expected to cause an execution error.

2. The method as recited in claim 1, wherein the command dataset includes multiple testcases, each of the testcases comprising a unique set of command data.

3. The method as recited in claim 1, wherein the command data includes invalid command data that is expected to cause an execution error.

4. The method as recited in claim 1, further comprising parsing the command dataset into the command data.

5. The method as recited in claim 1, further comprising:
executing a first prespecified routine before each execution of a command permutation for setup purposes;
executing a second prespecified routine after a successful execution of a command permutation for cleanup purposes;
executing a third prespecified routine after skipping an execution of a command permutation for tracking at least which commands fail.

6. The method as recited in claim 5, wherein the prespecified routine is designed specifically to deal with executions that hang and logs data to further define a source of the hang.

7. The method as recited in claim 1, further comprising adding expected results of the execution of each of the command permutations to the log along with the results of the execution of each of the command permutations.

8. The method as recited in claim 1, wherein generating the command permutations using the command data includes generating all possible combinations of parameters in the command data for generating command permutations having each of the combinations.

9. A computer program product, the computer program product comprising:
a non-transitory computer usable medium having computer usable program code stored therewith, the computer usable program code comprising:
computer usable program code configured to receive a command dataset of command data;
computer usable program code configured to generate command permutations using the command data;
computer usable program code configured to sequentially input the command permutations to a command line interface;
computer usable program code configured to execute each of the command permutations;
computer usable program code configured to determine whether to skip an execution based on an elapsed time of the execution;
computer usable program code configured to receive results of execution of each of the command permutations;
computer usable program code configured to generate a log of at least one of the results and a derivative thereof; and
computer usable program code configured to execute a prespecified routine before and/or after skipping an execution of a command permutation for tracking at least which commands fail and parameter values during execution of the command permutation,
wherein the command line interface is on a target system, and
wherein the command data includes invalid command data that is expected to cause an execution error.

10. The computer program product as recited in claim 9, wherein the command dataset includes multiple testcases, each of the testcases comprising a unique set of command data.

11. The computer program product as recited in claim 9, wherein the command data includes invalid command data that is expected to cause an execution error.

12. The computer program product as recited in claim 9, further comprising computer usable program code configured to parse the command dataset into the command data.

13. The computer program product as recited in claim 9, further comprising computer usable program code configured to execute a prespecified routine after skipping an execution.

14. The computer program product as recited in claim 9, further comprising computer usable program code configured to add expected results of the execution to the log.

15. The computer program product as recited in claim 9, wherein generating the command permutations using the command data includes generating all possible combinations of parameters in the command data for generating command permutations having each of the combinations.

16. A method, comprising:
receiving a command dataset of command data of valid data that is expected to not cause an execution error and invalid data that is expected to cause an execution error;
generating command permutations using the command data;
sequentially inputting the command permutations to a command line interface;
determining whether to skip an execution based on an elapsed time of the execution;
receiving results of execution of the command permutations;
generating a log of at least one of the results and a derivative thereof;
storing the log on a data storage device or medium; and
executing a prespecified routine before and/or after skipping an execution of a command permutation for tracking at least which commands fail and parameter values during execution of the command permutation,
wherein the command line interface is on a target system, and
wherein the command data includes invalid command data that is expected to cause an execution error.

17. The method as recited in claim 16, further comprising adding expected results of the execution of each of the command permutations to the log along with the results of the execution of each of the command permutations.

18. A system, comprising:
circuitry for receiving a command dataset of command data of valid data that is expected to not cause an execution error, and invalid command data that is expected to cause an execution error;
circuitry for generating command permutations using the command data; circuitry for sequentially inputting the command permutations to a command line interface;
circuitry for determining whether to skip an execution based on an elapsed time of the execution;
circuitry for receiving results of execution of the command permutations; circuitry for generating a log of expected results along with at least one of: the received results and a derivative thereof;
a data storage device for storing the log; and
circuitry for executing a prespecified routine before and/or after skipping an execution of a command permutation for tracking at least which commands fail and parameter values during execution of the command permutation,
wherein the command line interface is on a target system, and
wherein the command data includes invalid command data that is expected to cause an execution error.

\* \* \* \* \*